(12) United States Patent
Park et al.

(10) Patent No.: US 7,912,972 B2
(45) Date of Patent: Mar. 22, 2011

(54) METHOD OF CONTROLLING DEVICE CONNECTED TO UNIVERSAL PLUG AND PLAY HOME NETWORK VIA INTERNET, AND SYSTEM AND DEVICE FOR THE METHOD

(75) Inventors: Kyung-mo Park, Seoul (KR); Young-sun Ryu, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 11/762,454

(22) Filed: Jun. 13, 2007

(65) Prior Publication Data
US 2008/0120422 A1   May 22, 2008

(30) Foreign Application Priority Data
Nov. 21, 2006 (KR) .................. 10-2006-0115449

(51) Int. Cl.
*G06F 15/16* (2006.01)
(52) U.S. Cl. ........................ 709/229; 709/217
(58) Field of Classification Search .......... 709/227, 709/229, 219, 217; 726/3, 6
See application file for complete search history.

(56) References Cited

U.S. PATENT DOCUMENTS

| 2001/0025322 A1 | 9/2001 | Song et al. |
| 2003/0018753 A1 | 1/2003 | Seki |
| 2006/0245403 A1* | 11/2006 | Kumar .................. 370/338 |
| 2008/0108437 A1* | 5/2008 | Kaarela et al. .......... 463/42 |

FOREIGN PATENT DOCUMENTS

| CN | 1663191 A | 8/2005 |
| JP | 2001-285371 A | 10/2001 |
| JP | 2003-030072 A | 1/2003 |
| WO | 2004/008694 | 1/2004 |

OTHER PUBLICATIONS

Japanese Office Communication Dated Oct. 6, 2009 with an English Language Translation.
The First Office Action of The State Intellectual Property Office of P.R. China for Application No. 200710128234.4, dated Jun. 28, 2010.

* cited by examiner

*Primary Examiner* — Frantz B Jean
(74) *Attorney, Agent, or Firm* — Sughrue Mion, PLLC

(57) ABSTRACT

A method, system, and device for controlling a device connected to a UPnP (universal plug and play) home network using the Internet is provided. This method includes: subscribing to the external device outside the UPnP home network and informing the external device of control information about the device connected to the UPnP home network; converting a third-party notification message about control of the device connected to the UPnP home network, the third-party notification message being received from the external device via the Internet, into a control message with respect to a device that provides a web-based user interface or a device that provides no web-based user interfaces; and transmitting the control message to the device that provides a web-based user interface or the device that provides no web-based user interfaces.

24 Claims, 3 Drawing Sheets

METHOD OF CONTROLLING DEVICE CONNECTED TO UNIVERSAL PLUG AND PLAY HOME NETWORK VIA INTERNET, AND SYSTEM AND DEVICE FOR THE METHOD

CROSS-REFERENCE TO RELATED PATENT APPLICATION

This application claims the benefit of Korean Patent Application No. 10-2006-0115449, filed on Nov. 21, 2006, in the Korean Intellectual Property Office, the disclosure of which is incorporated herein in its entirety by reference.

BACKGROUND OF THE INVENTION

1. Field of the Invention

Method and apparatuses consistent with the present invention relate to using the internet to control a device connected to a universal plug and play (UPnP) home network, and more specifically, controlling a device connected to a UPnP home network using a polling-based notification service provided by the Consumer Electronics Association (CEA) 2014 standard.

2. Description of the Related Art

Computing technology has been recently applied to various devices, and as such, cheap and universal networking techniques are appearing and being used. For example, various devices used in houses, such as refrigerators, TVs, washing machines, person computers (PCs), and audio players, are connected to a network, so that user convenience is increased. In order to achieve this networking, a universal plug and play (UPnP) standard has been proposed. UPnP is a standard that allows devices, such as a PC, a peripheral device, an intelligent home appliance, and wireless equipment, to automatically recognize each other using the Internet and a web protocol when they are connected to a network. When UPnP is used and a user adds a device to the network, the device is automatically installed without manual configuration, receives a TCP/IP address, and uses a discovery protocol based on the Internet HTTP in order to inform the other devices of the existence of the additionally connected device. For example, when a camera and a printer have been connected to a network and a picture is to be output from the printer, a button of the camera is pressed, and the camera sends a discovery request signal to the network in order to search for an available printer on the network. Then, in response to the discovery request signal, the printer sends its location in Uniform Resource Locator (URL) format to the camera. The camera and the printer may use an extensible markup language (XML) as a common language or determine a way of communicating with each other by protocol negotiation. When the common language for communication is determined, the camera is able to control the printer to print out a desired picture. In particular, the UPnP device architecture version 1.0 enables home appliances within a UPnP home network to be peer-to-peer networked on the basis of a decentralized and open networking structure instead of being under a centralized control. In this case, the UPnP specifies that standard networking technologies, such as IP and HTTP, are used as technical components of the decentralized and open networking structure so that the technical components operates independently of an operating system, a platform, and a transmission medium.

Generally, UPnP device architecture version 1.0 uses a multicasting method in order to discover a device, and thus it is impossible to discover and control devices existing on other networks. When a UPnP home network is implemented as a virtual private network (VPN) due to lack of IPv4 addresses, a UPnP device within the UPnP home network is unable to access via the Internet unless undergoing network address translation (NAT). Although the UPnP device within the UPnP home network is able to access via the Internet using a photo-mapping method, a separate UPnP Internet gateway device (IGD) is required.

For these reasons, when a UPnP home network device is constructed according to the UPnP version 1.0, it is impossible to control a device connected to a UPnP home network that is constructed using a VPN.

SUMMARY OF THE INVENTION

The present invention provides a method and system for controlling a device connected to a universal plug and play (UPnP) home network using a polling-based notification service that uses the Internet.

According to an aspect of the present invention, there is provided a method of controlling a device connected to a UPnP home network on the basis of a signal transmitted by an external device outside the UPnP home network, the method including the operations of: subscribing to the external device outside the UPnP home network and informing the external device of control information about the device connected to the UPnP home network; converting a third-party notification message about control of the device connected to the UPnP home network, the third-party notification message being received from the external device via the Internet, into a control message with respect to a device that provides a web-based user interface or a device that provides no web-based user interfaces; and transmitting the control message to the device that provides a web-based user interface or the device that provides no web-based user interfaces.

According to another aspect of the present invention, there is provided a computer readable recording medium having a recorded program for executing the method.

According to another aspect of the present invention, there is provided a device for controlling a device connected to a UPnP home network on the basis of a signal transmitted by an external device outside the UPnP home network, the device including a notification/event processing unit, a first control point, and a second control point. The notification/event processing unit converts a third-party notification message about control of the device connected to the UPnP home network, the third-party notification message being received from the external device via the Internet, into a control message with respect to a device that provides a web-based user interface or a device that provides no web-based user interfaces, and subscribes to the external device outside the UPnP home network and informs the external device of control information about the device connected to the UPnP home network. The first control point transmits the control message with respect to the device that provides a web-based user interface and collects control information about the device that provides a web-based user interface. The second control point transmits the control message with respect to the device that provides no web-based user interfaces and collects control information about the device that provides no web-based user interfaces.

According to another aspect of the present invention, there is provided a method of remotely controlling a device connected to a UPnP home network, the method including: a first device connected to the UPnP home network subscribing to a second device outside the UPnP home network, wherein the first device informs the second device of control information about the device connected to the UPnP home network; when an event about the device is generated, generating a third-party notification message about the event in the second device; the second device transmitting the third-party notification message to the first device via the Internet; the first device converting the third-party notification message into a control message with respect to a device that provides a web-based user interface or a device that provides no web-based user interfaces; and the first device transmitting the control message to the device that provides a web-based user interface or the device that provides no web-based user interfaces.

According to another aspect of the present invention, there is provided a computer-readable recording medium having recorded thereon a computer program for executing the method.

According to another aspect of the present invention, there is provided a system for remotely controlling a device connected to a UPnP home network, the system comprising: a second device generating a third-party notification message about an event when the event is generated, and transmitting the third-party notification message via an Internet to a first device connected to the UPnP home network; and a first device receiving the third-party notification message from the second device, converting the third-party notification message into a control message with respect to a device that provides a web-based user interface or a device that provides no web-based user interfaces, and transmitting the control message to one of the device that provides a web-based user interface and the device that provides no web-based user interfaces.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Figure 1:
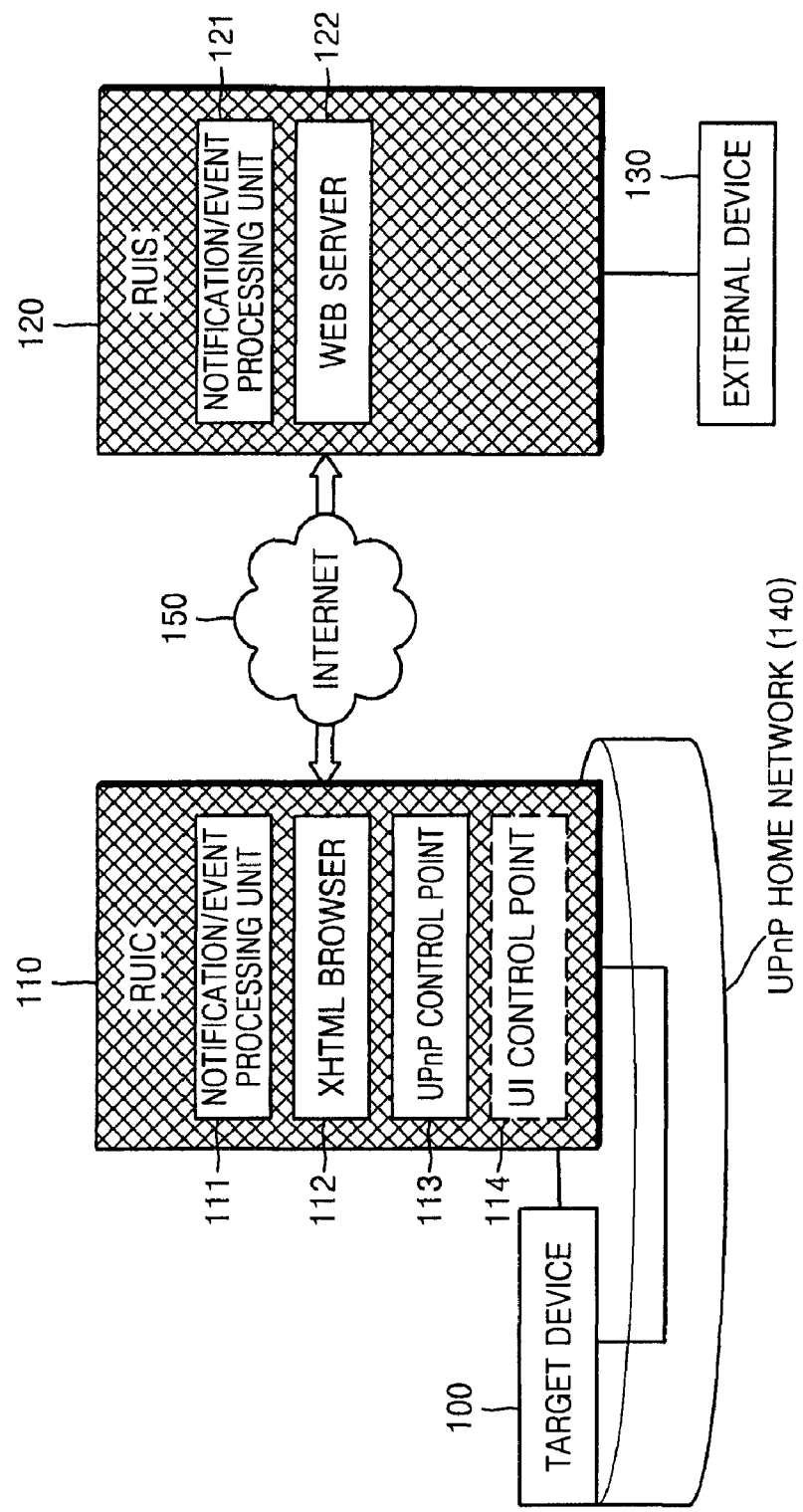
FIG. 1 is a schematic diagram of a CEA-2014 system according to an exemplary embodiment of the present invention.

The present invention will now be described more fully with reference to the accompanying drawings, in which exemplary embodiments of the invention are shown. Like reference numerals in the drawings denote like elements. It should be understood, however, that the exemplary embodiments are merely examples of the invention, which may be embodied in various forms. The following description and drawings are not to be construed as limiting the invention and numerous specific details are described to provide a thorough understanding of the present invention, as the basis for the claims and as a basis for teaching one of ordinary skill in the art how to make and/or use the invention. However in certain instances, well-known or conventional details are not described in order not to unnecessarily obscure the present invention in detail.

FIG. 1 is a schematic diagram of a CEA-2014 system according to an exemplary embodiment of the present invention. Referring to FIG. 1, the CEA-2014 system includes a remote user interface client (RUIC) 110 connected to a universal plug and play (UPnP) home network 140, a target device 100 connected to the UPnP home network 140, and a remote user interface server (RUIS) 120 connected to the RUIC 110 via an Internet 150.

The target device 100 includes, for example, a device that provides a web-based user interface, and a device that provides no web-based user interfaces. For example, the device that provides a web-based user interface may be a CEA-2014 device, and the device that provides no web-based user interfaces may be an UPnP device or a legacy device. CEA-2014 denotes a new standard published by a web-based Consumer Electronics Association's (CEA) R7 home network association. The CEA-2014 standard is a web-based protocol and framework for a remote user interface based on a UPnP network and the Internet. The CEA-2014 device is a UPnP device that provides a web-based user interface, whereas the UPnP device is a UPnP device that provides no web-based user interfaces. The legacy device denotes a device that neither has a UPnP function nor provides a web-based user interface.

Referring to FIG. 1, a notification/event processing unit 111 of the RUIC 110 receives a third-party notification message from a notification/event processing unit 121 of the RUIS 120.

The third-party notification message is produced by the RUIS 120 according to the CEA-2014 standard and includes an event that a user has issued. The notification/event processing unit 111 converts the received third-party notification message into a control message for a device that provides a web-based user interface or a device that provides no web-based user interfaces, and transmits the control message to a UPnP control point 113 or a user interface (UI) control point 114. In order to receive a CEA-2014 polling-based notification service, the notification/event processing unit 111 subscribes to the RUIS 120, with control information about devices that have been collected by the UPnP control point 113 or the UI control point 114.

The UPnP control point 113 receives from the notification/event processing unit 111 the control message for a device that provides no web-based user interfaces, and transmits the control message to the device that provides no web-based user interfaces. Thereafter, the device that provides no web-based user interfaces performs an operation depending on the control message. Preferably, the UPnP control point 113 receives the result of the control from the device that provides no web-based user interfaces, generates a report message for the control result, and transmits the report message to the RUIS 120. The UPnP control point 113 also collects control information about the device that provides no web-based user interfaces, using an UPnP action. In particular, a legacy device has no UPnP function and thus the legacy device itself should register control information in the UPnP control point 113.

Meanwhile, the UI control point 114 receives from the notification/event processing unit 111 the control message for a device that provides a web-based user interface, and transmits the control message to the device that provides a web-based user interface. Thereafter, the device that provides a web-based user interface performs an operation depending on the control message. Preferably, the UI control point 114 receives the result of the control from the device that provides a web-based user interface, generates a report message for the control result, and transmits the report message to the RUIS 120. The UI control point 114 also collects control information about the device that provides a web-based user interface, using an UPnP action.

An extensible hypertext markup language (XHTML) browser 112 is included in the RUIC 110 and displays a web-based user interface received from a web server 122 of the RUIS 120.

The web server 122 of the RUIS 120 provides, to an external device 130, a web-based user interface for controlling a device connected to the UPnP home network 140. Preferably, the web server 122 may authenticate the external device 130 when the external device 130 tries to contact the RUIS 120.

The external device 130 is connected to the RUIS 120 by wire or wirelessly. The external device 130 also receives and displays the web-based user interface provided by the web server 22, so that a user provides a desired control event to the RUIS 120.

The notification/event processing unit 121 receives the control event generated by the external device 130, generates a third-party notification message including the received control event, and transmits the third-party notification message to the RUIC 110 by means of a polling-based notification service using the Internet. The polling-based notification service using the Internet is provided according to the CEA-2014 standard. When an event is generated, the generated event is provided to the subscribed RUIC 110 by the polling-based notification service. The polling-based notification service is the same as really simple syndication (RSS) in that updated contents of a website are provided to a subscriber so that the subscriber can easily recognize the updates through the Internet.

Figure 2:
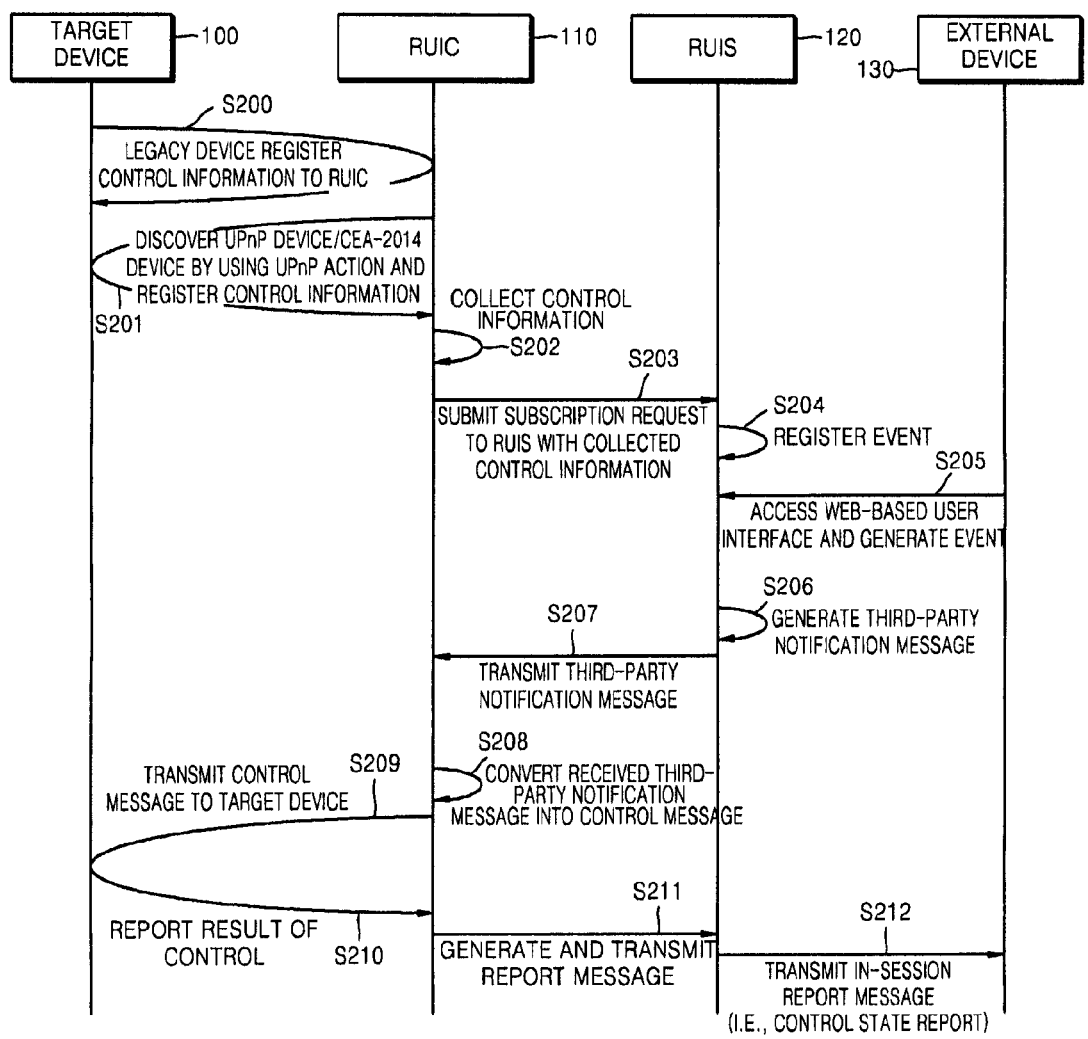
FIG. 2 is a flowchart of a method of controlling a device connected to a universal plug and play (UPnP) home network via the Internet, according to an exemplary embodiment of the present invention.

FIG. 2 is a flowchart of a method of controlling a device connected to a UPnP home network via the Internet, according to an exemplary embodiment of the present invention.

Referring to FIGS. 1 and 2, in operation S200, a legacy device itself registers control information to the UPnP control point 113 using an out-of-band protocol.

In operation S201, unlike the legacy device, the UPnP control point 113 and the UI control point 114 discover a UPnP device and a CEA-2014 device using an UPnP action and registers control information about the discovered UPnP device and CEA-2014 device.

In operation S202, the UPnP control point 113 and the UI control point 114 collect control information about the device connected to the UPnP home network from the registered control information.

In operation S203, the notification/event processing unit 111 of the RUIC 110 submits a subscription request to the notification/event processing unit 121 of the RUIS 120, with the collected control information about the device connected to the UPnP home network.

In operation S204, the notification/event processing unit 121 authorizes the subscription in response to the subscription request and registers the received control information (including an event) about the device connected to the UPnP home network.

In operation S205, a user accesses the web-based user interface (i.e., a web page) provided by the web server 122, so that an event is generated.

In operation S206, the notification/event processing unit 121 generates a third-party notification message about the generated event.

In operation S207, the notification/event processing unit 121 transmits the third-party notification message to the notification/event processing unit 111 of the RUIC 110 via the Internet.

In operation S208, the notification/event processing unit 111 of the RUIC 110 converts the received third-party notification message into a control message for a device that provides a web-based user interface or a device that provides no web-based user interfaces.

In operation S209, the UPnP control point 113 or the UI control point 114 transmits the control message to the target device 100 (e.g., a legacy device, a UPnP device, or a CEA-2014 device).

In operation S210, the target device 100 performs a control operation depending on the control message and transmits the result of the control to the UPnP control point 113 or the UI control point 114.

In operation S211, the UPnP control point 113 or the UI control point 114 generates a report message about the result of the control and transmits the report message to the web serve 122 of the RUIS 120.

In operation S212, the web server 122 transmits the received report message to the external device 130. Then, the external device 130 displays the report message on the web-based user interface (i.e., a web page).

Figure 3:
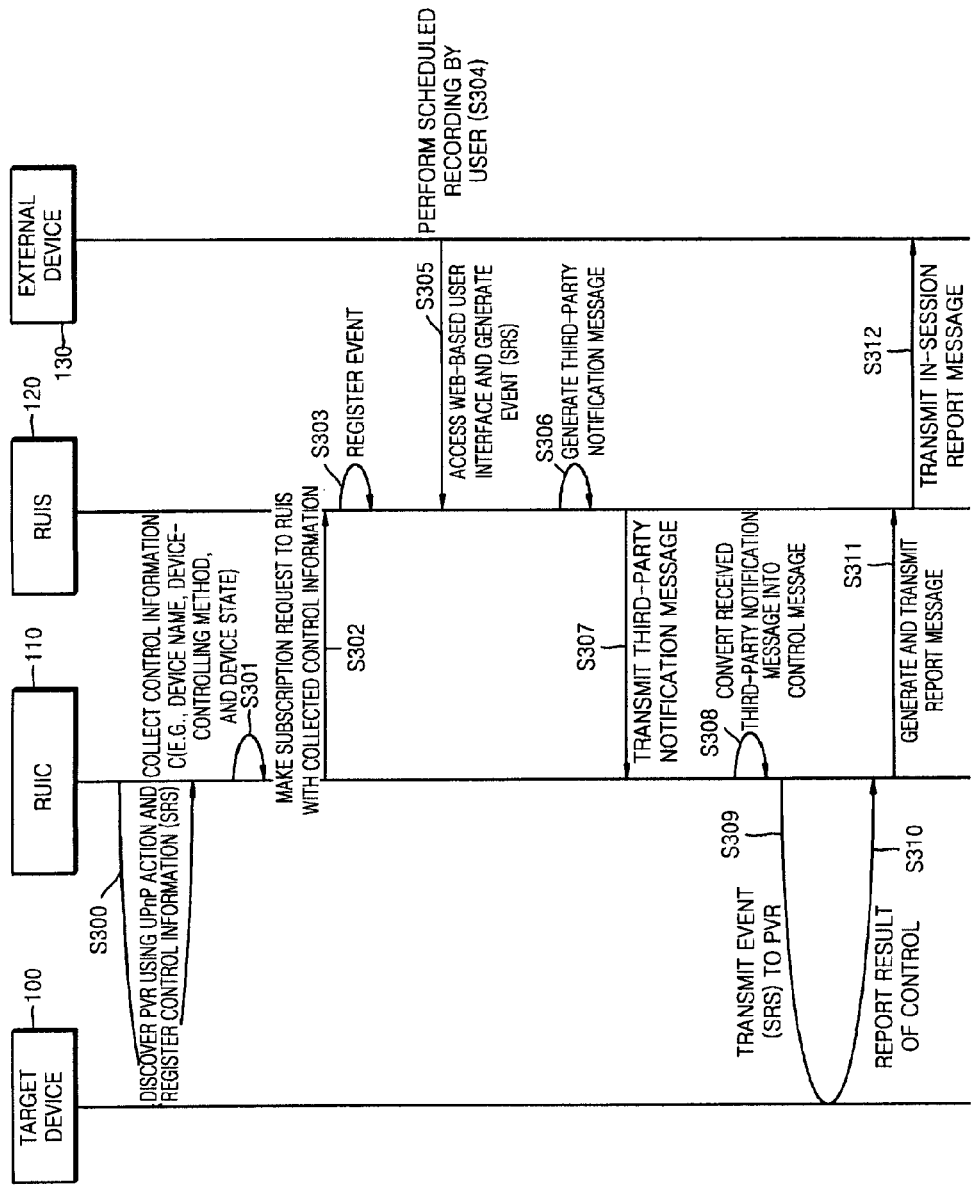
FIG. 3 is a flowchart of a scheduled recording method using the Internet, according to an exemplary embodiment of the present invention.

FIG. 3 is a flowchart of a scheduled recording method using the Internet, according to an exemplary embodiment of the present invention. In FIG. 3, a device that is connected to a UPnP home network and is to be controlled by the external device 130 is a personal video recorder (PVR). It is assumed that the PVR is a UPnP device that provides no web-based user interfaces.

In operation S300, the UPnP control point 113 discovers a UPnP device (i.e., a PVR) using a UPnP action and registers control information about the UPnP device. The control information may include the name of the UPnP device, a method of controlling the UPnP device, the status of the UPnP device, etc. Here, SRS denotes a scheduled recording service.

In operation S301, the UPnP control unit 113 collects the control information about the device connected to the UPnP home network from the registered control information.

In operation S302, the notification/event processing unit 111 of the RUIC 110 submits a subscription request to the notification/event processing unit 121 of the RUIS 120, with the collected control information about the device connected to the UPnP home network.

In operation S303, the notification/event processing unit 121 authorizes the subscription in response to the subscription request and registers the received control information (including an event) about the device connected to the UPnP home network.

In operations S304 and S305, a user accesses the web-based user interface (i.e., a web page) provided by the web server 122, so that an event (i.e., a scheduled recording service) is generated. The scheduled recording service may be a recording date, a recording time, etc.

In operation S306, the notification/event processing unit 121 generates a third-party notification message about the generated event.

In operation S307, the notification/event processing unit 121 transmits the third-party notification message to the notification/event processing unit 111 of the RUIC 110 via the Internet.

In operation S308, the notification/event processing unit 111 of the RUIC 110 converts the received third-party notification message into a control message for the UPnP device, that is, the PVR.

In operation S309, the UPnP control point 113 transmits the control message to the UPnP device, that is, the PVR.

In operation S310, the UPnP device, that is, the PVR, performs a control operation depending on the control message. In operation S311, the UPnP device, that is, the PVR, transmits the result of the control to the UPnP control point 113.

In operation S312, the UPnP control point 113 generates a report message about the result of the control and transmits the report message to the web server 122 of the RUIS 120. In operation S312, the web server 122 transmits the received report message to the external device 130. Then, the external device 130 displays the report message on the web-based user interface (i.e., a web page).

As described above, a user is able to control a device connected to a UPnP home network via the Internet, using a polling-based notification service using the Internet. Also, a third-party notification message transmitted by a RUIS is converted into a control message about a CEA-2014 device, a UPnP device, or a legacy device that has no UPnP function, so that compatibility of the CEA-2014 device and the UPnP device with a non-standard device is ensured.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a device connected to a UPnP (universal plug and play) home network based on a signal transmitted by an external device outside the UPnP home network, the method comprising:
    subscribing the device connected to the UPnP home network to the external device outside the UPnP home network and informing the external device of control information about the device connected to the UPnP home network;
    receiving a third-party notification message about control of the device connected to the UPnP home network, from the external device via the Internet,
    converting the third-party notification into a control message for the device connected to the UPnP home network; and
    transmitting the control message to the device connected to the UPnP home network, wherein the device connected to the UPnP home network is a device that provides a web-based user interface or a device that provides no web-based user interface.

2. The method of claim 1, further comprising:
    generating a report message about a result of controlling the device connected to the UPnP home network; and
    transmitting the report message to the external device outside the UPnP home network via the Internet.

3. The method of claim 1, wherein the subscribing to the external device outside the UPnP home network comprises:
    discovering the device connected to the UPnP home network;
    collecting control information used to control the discovered device; and
    subscribing to the external device outside the UPnP home network, using the collected control information.

4. The method of claim 3, wherein collecting comprises collecting the control information using an out-of-band protocol if the device connected to the UPnP home network is a legacy device.

5. The method of claim 1, wherein the device that provides the web-based user interface is a CEA-2014 device, and the device that provides no web-based user interface is one of a UPnP device and a legacy device.

6. A computer-readable recording medium having recorded thereon software instructions for enabling a computer to control a device connected to a UPnP (universal plug and play) home network based on a signal transmitted by an external device outside the UPnP home network, the software instructions comprising the steps of:
    subscribing the device connected to the UPnP home network to the external device outside the UPnP home network and informing the external device of control information about the device connected to the UPnP home network;
    receiving a third-party notification message about control of the device connected to the UPnP home network, from the external device via the Internet,
    converting the third-party notification into a control message for the device connected to the UPnP home network; and
    transmitting the control message to the device connected to the UPnP home network, wherein the device connected to the UPnP home network is a device that provides a web-based user interface or a device that provides no web-based user interface.

7. A device for controlling a device connected to a UPnP home network based on a signal transmitted by an external device outside the UPnP home network, the device comprising:
    a notification event processing unit which converts a third-party notification message about control of the device connected to the UPnP home network received from the external device via the Internet, into a control message for the device connected to the UPnP home network, and which subscribes to the external device outside the UPnP home network and informs the external device of control information about the device connected to the UPnP home network, wherein the device connected to the UPnP home network is a device that provides a web-based user interface or a device that provides no web-based user interface;
    a first control point which transmits the control message for the device connected to the UPnP home network and collects control information about the device connected to the UPnP home network, if the device provides the web-based user interface; and
    a second control point which transmits the control message for the device connected to the UPnP home network and collects control information about the device connected to the UPnP home network, if the device provides no web-based user interface.

8. The device of claim 7, wherein one of the first control point and the second control point generates a report message about a result of controlling the device connected to the UPnP home network, and transmits the report message to the external device outside the UPnP home network.

9. The device of claim 7, wherein the device that provides the web-based user interface is a CEA-2014 device, and the device that provides no web-based user interface is one of a UPnP device and a legacy device.

10. The device of claim 7, wherein the second control point collects the control information using an out-of-band protocol if the device connected to the UPnP home network is a legacy device.

11. A method of remotely controlling a target device connected to a UPnP home network, the method comprising:
    subscribing, by a first device connected to the UPnP home network, to a second device outside the UPnP home network, informing, by the first device, the second device about control information about the target device connected to the UPnP home network;

if an event about the target device is generated, generating a third-party notification message about the event in the second device;

transmitting the third-party notification message from the second device to the first device via the Internet;

converting the third-party notification message, by the first device, into a control message for the target device; and the first device transmitting the control message to the target device, wherein the target device is a device that provides a web-based user interface or a device that provides no web-based user interface.

12. The method of claim 11, further comprising:
generating a report message about a result of controlling the target device, by the first device; and
transmitting the report message to the second device.

13. The method of claim 11, wherein the subscribing of the first device to the second device comprises:
discovering the target device connected to the UPnP home network, by the first device;
collecting control information used to control the discovered target device; and
subscribing to the second device and informing the second device of the collected control information.

14. The method of claim 11, further comprising providing a web-based user interface for controlling the target device.

15. The method of claim 13, wherein the subscribing of the first device to the second device further comprises collecting the control information using a out-of-band protocol if the target device is a legacy device.

16. The method of claim 11, wherein if the target device provides the web-based user interface, the target device is a CEA-2014 device, and if the target device provides no web-based user interface, the target device is one of a UPnP device and a legacy device.

17. A computer-readable recording medium having recorded thereon software instructions for enabling a computer to control a target device connected to a UPnP home network, the software instructions comprising the steps of:
subscribing, by a first device connected to the UPnP home network, to a second device outside the UPnP home network,
informing, by the first device, the second device about control information about the target device connected to the UPnP home network;
if an event about the target device is generated, generating a third-party notification message about the event in the second device;
transmitting the third-party notification message from the second device to the first device via the Internet;
converting the third-party notification message, by the first device, into a control message for the target device; and
transmitting the control message from the first device to the target device,
wherein the target device is a device that provides a web-based user interface or a device that provides no web-based user interface.

18. A system for remotely controlling a device connected to a UPnP home network, the system comprising:
a second device which generates a third-party notification message about an event if the event is generated, and transmits the third-party notification message via an Internet; and
a first device which receives the third-party notification message from the second device, converts the third-party notification message into a control message for the device connected to the UPnP home network, and transmits the control message to the device connected to the UPnP home network,
wherein the device connected to the UPnP home network is a device that provides a web-based user interface or a device that provides no web-based user interfaces.

19. The system of claim 18, wherein the second device comprises:
a web server providing a web-based user interface; and
a notification and event processing unit which generates a third-party notification message about an event if the event is generated through the web-based user interface, and transmits the third-party notification message to the first device via the Internet.

20. The system of claim 18, wherein the first device comprises:
a notification and event processing unit which converts the third-party notification message into the control message for the device connected to the UPnP home network, and subscribes to the first device using control information about the target device;
a first control point which transmits the control message for the device connected to the UPnP home network, if the device connected to the UPnP home network is a device that provides the web-based user interface, and collects control information about the device connected to the UPnP home network and provides the web-based user interface; and
a second control point which transmits the control message for the device connected to the UPnP home network, and collects control information about the device connected to the UPnP home network, if the device connected to the UPnP home network is a device that provides no web-based user interface.

21. The system of claim 20, wherein one of the first control point and second control point generates a report message about a result of controlling the device and transmits the report message to the second device.

22. The system of claim 18, wherein the device that provides the web-based user interface is a CEA-2014 device, and the device that provides no web-based user interfaces is one of a UPnP device and a legacy device.

23. The system of claim 20, wherein the second control point collects the control information using an out-of-band protocol if the device connected to the UPnP home network is a legacy device.

24. The method of claim 1, wherein the third-party notification message is transmitted from the external device by a polling-based notification service.

* * * * *